United States Patent [19]
Cotellessa

[11] Patent Number: 5,718,548
[45] Date of Patent: Feb. 17, 1998

[54] STAPLE ASSEMBLY

[75] Inventor: Sergio Cotellessa, North Perth, Australia

[73] Assignee: Clipmaster Corporation PTY Ltd., Western Australia, Australia

[21] Appl. No.: 423,548

[22] Filed: Apr. 17, 1995

Related U.S. Application Data

[63] Continuation-in-part of Ser. No. 937,833, Oct. 20, 1992, abandoned.

[51] Int. Cl.⁶ .................................................. H01B 17/00
[52] U.S. Cl. .................. 411/456; 411/469; 411/475; 411/920; 411/903; 227/156
[58] Field of Search .................. 227/156; 411/442–445, 411/475, 469, 473, 456, 920, 903, 258

[56]                    References Cited

U.S. PATENT DOCUMENTS

| | | | |
|---|---|---|---|
| 1,106,938 | 8/1914 | Greenfield | 411/444 |
| 1,654,371 | 12/1927 | Goodstein | 411/443 |
| 1,736,807 | 11/1929 | Thomas | 411/920 |
| 2,526,902 | 10/1950 | Rublee | 411/444 |
| 3,741,455 | 6/1973 | Wandel et al. | 227/120 |
| 3,894,174 | 7/1975 | Cartun | 411/920 |
| 3,915,366 | 10/1975 | Mitchell | |
| 4,087,035 | 5/1978 | Harmon | |
| 4,380,312 | 4/1983 | Landrus | |
| 4,402,445 | 9/1983 | Green | 227/15 |
| 4,537,343 | 8/1985 | Johansson | 227/120 |
| 4,552,296 | 11/1985 | Sheng | 227/132 |
| 4,588,152 | 5/1986 | Ruehl et al. | 411/475 |
| 4,670,926 | 6/1987 | Bruno | |
| 4,697,045 | 9/1987 | Beatty | 411/456 |
| 4,766,782 | 8/1988 | Tanner | |
| 4,801,061 | 1/1989 | Mangone, Jr. | 227/120 |
| 4,801,064 | 1/1989 | Mangone, Jr. | 227/120 |
| 4,805,824 | 2/1989 | Erickson | 227/120 |
| 5,223,675 | 6/1993 | Taft | 411/920 |

FOREIGN PATENT DOCUMENTS

| | | | |
|---|---|---|---|
| 11567/70 | 8/1971 | Australia | |
| 50839/85 | 6/1986 | Australia | |
| 67597/65 | 6/1987 | Australia | |
| 207035 | 12/1986 | European Pat. Off. | |
| 1121396 | 8/1956 | France | 411/475 |
| 1603698 | 8/1970 | Germany | |
| 2006873 | 9/1970 | Germany | 227/120 |
| 2907855 | 9/1980 | Germany | |
| 2-261913 | 10/1990 | Japan | |
| 2032327 | 5/1980 | United Kingdom | 227/132 |
| 83/03721 | 10/1983 | WIPO | |

*Primary Examiner*—Rinald I. Rada
*Assistant Examiner*—Boyer Ashley
*Attorney, Agent, or Firm*—Larson & Taylor

[57]                    ABSTRACT

A staple assembly 10 for use in a stapling tool (not shown) for fixing an elongate member such as a cable C onto a substrate such as a wooden beam. The staple assembly 10 comprises a staple 12 having a back 14 and legs 16 depending from opposite ends of the back 14. Also included is a saddle 18 for receiving the staple 12. The saddle comprises a body 20 and two posts 22 which depend from opposite ends of the body 20 in a parallel manner. The body 20 end posts 22 define a receptacle 24 for receiving the cable C. A groove 26 is formed along the outer surface of posts 22 and body 20 for seating the staple 18. A protuberance 28 is formed on the body 20 and extends into the receptacle 24 for engaging the cable C.

In one embodiment, the staple 12 is provided with barbs 36 on the inside of legs 16 for engaging an under surface 38 of the posts 22. This prevents the staple 12 from separating from the saddle 18 during transportation and use. Barbs 40 can also be provided on an opposite side of the leg 16 for gripping the substrate into which the staple 12 is to be driven.

16 Claims, 3 Drawing Sheets

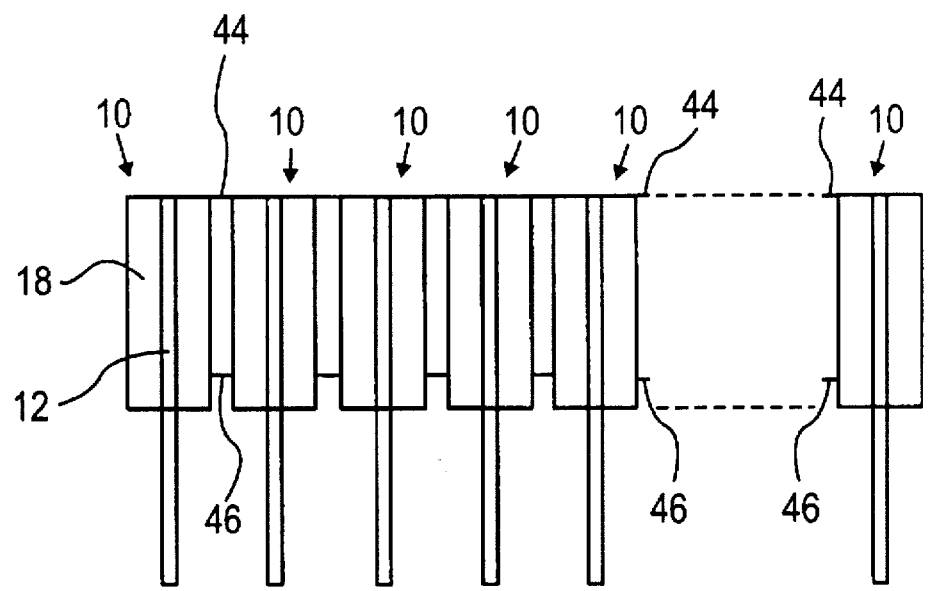
*FIG. 3*
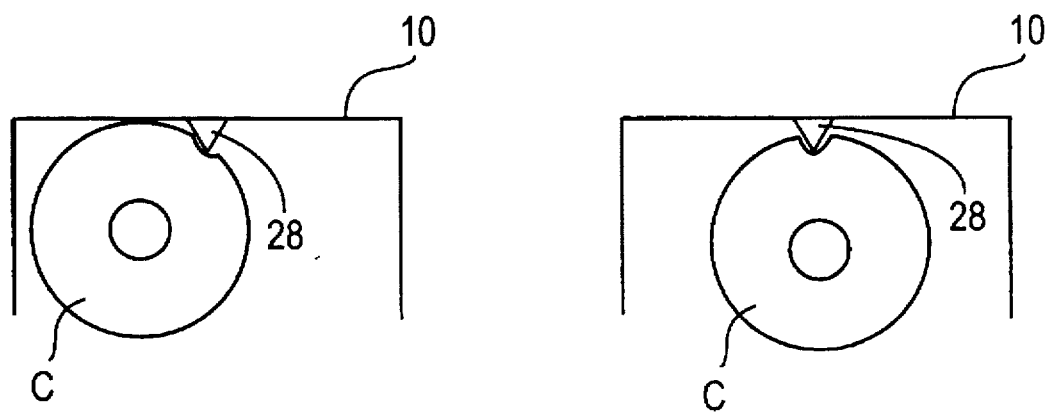
*FIG. 4A*   *FIG. 4B*

STAPLE ASSEMBLY

This application is a continuation-in-part of U.S. patent application Ser. No. 07/937,833 filed 20 Oct. 1992, now abandoned.

FIELD OF THE INVENTION

This invention relates to the field of staple assemblies for fastening a cable to a substrate and, in particular, but not exclusively, to a staple assembly comprising a staple and an underlying saddle for inhibiting contact between the staple and cable.

BACKGROUND INFORMATION

In connecting electrical equipment and devices to a power supply or otherwise together, it is common for a power or signal carrying cable connecting the electrical equipment to be fastened to a wall, roof beam, base board or other surface (hereinafter referred to generally as a "substrate"). A primary requirement during fastening of a cable is to ensure that the electrical and transmission characteristics of the cable are not damaged or adversely effected by the fastening means. This may typically occur by the fastening means penetrating an insulating layer of the cable and contacting or otherwise physically damaging the signal or power carrying medium of the cable.

One known type of method for fixing a cable to a substrate is through use of "U" clips which comprise a U-shaped plastic saddle provided with a foot at the end of one arm of the U-shaped saddle for receiving a nail. In this form of clip, the U-saddle is placed over the cable and the nail driven through the foot into the substrate by striking with a hammer in a known manner. A disadvantage of this type of arrangement is that an installer must position both the clip and the cable with one hand and then operate the hammer with the other hand. This requires skill and is tiresome. Also, there is always a danger that the hammer may strike the fingers of the installer or indeed strike the cable directly leading to damage thereto. Further, in confined spaces it is often difficult to wield a hammer to drive the nail into the underlying surface.

The above problem has led to the development of a wide range of stapling guns and associated staples for the relatively efficient and effective fastening of cables to a surface. The staple guns typically comprise one or more magazines for holding a supply of staples and/or saddles and a striker or hammer which can be operated mechanically, electrically or pneumatically to drive a staple, optionally on a saddle, over the cable and into the underlying substrate.

The present invention is concerned with a staple assembly which can be used in such staple guns.

U.S. Pat. No. 4,805,824 (ERICKSON) discloses, in a general sense, the concept of a staple with an underlying saddle. The saddle or clip of ERICKSON shown in FIG. 11 is provided with a channel having a smooth surface for receiving an underlying cable. While the saddle or clip on the face of it will provide sufficient protection for an underlying cable, it is apparent that unless the cable is of the size so as to form a tight interference fit with the channel, the cable will be free to slide through channel. Thus, in the event that the cable is to be fastened to an underside of, for example, a beam, the saddle or clip will be unable to tautly hold the cable so that the cable will tend to sag between adjacent clips placing mechanical strain on the cable which could adversely effect its transmission characteristics.

One way of overcoming the above problems in ERICKSON is to place ribs on the inside legs of the saddle which are laterally offset from each other so as to form a kink in the cable. Such an arrangement is taught in U.S. Pat. No. 4,588,152 (RUEHL). As shown in FIG. 3, RUEHL discloses a clip having a recess for receiving a cable and opposite side walls provided with respective offset ribs. The ribs form a "tortuous path" for cable C. That is, the ribs effectively form a kink in the cable C. However, in some types of cables, for example optical fibres and coaxial cables, the formation of kinks is undesirable as it adversely effects the transmission characteristics of the cable.

It is an object of the present invention to provide a staple assembly for fastening a cable to a substrate which, while protecting the cable from adverse effects to its transmission characteristics during the fastening process, can also hold the cable tautly. It is a further object of the invention to provide a pre-loaded staple assembly comprising a staple and a saddle suitable for use in a staple gun provided with a single magazine or chamber.

SUMMARY OF THE INVENTION

According to one aspect of the present invention there is provided a staple assembly for use in a stapling tool for fixing an elongate member onto a substrate, said staple assembly comprising:

- a staple having a back and two legs extending in the same direction from said back; and,
- a saddle for receiving the staple, said saddle comprising a body and two posts extending from the body and defining a receptacle for receiving said elongate member, the saddle being adapted to be received over the elongate member on the substrate and adapted to have the staple seated over the body and down the posts, said body being provided with a protuberance extending into said receptacle for engaging said elongate member received in the receptacle;
- whereby, in use, the staple is driven onto the saddle and into the substrate over the elongate member with the saddle inhibiting contact between the staple and the elongate member, and with said protuberance engaging said elongate member in said receptacle.

According to another aspect of the present invention there is provided a staple assembly for use in a stapling tool for fixing an elongate member onto a substrate, the staple assembly comprising:

- a staple having a back having opposite ends and a leg depending substantially at right angles from each of said ends of said back, said legs being mutually parallel; and,
- a saddle separate from said staple and comprising a body having opposite ends and a post depending substantially at right angles from each of said ends of said body, said posts being mutually parallel, said body and posts defining a receptacle for receiving said elongate member;
- said body including a protuberance extending into said receptacle for engaging said elongate member, and said body and posts further including recesses for seating said back and legs, respectively, such that, in use, said staple assembly is fixed to said substrate over said elongate member via said stapling tool, with said elongate member received in said receptacle and engaged by said protuberance and said legs extending into said substrate.

According to a further aspect of the present invention there is provided a pre-loaded staple assembly for receipt in a single chamber of a stapling tool for fixing an elongate member onto a substrate, said preloaded staple assembly comprising:

a staple having a back and two legs extending from said back; and, a saddle having a body and two posts extending from said body, said body and posts defining a receptacle for receiving said elongate member, said body including a protuberance extending into said receptacle for engaging said elongate member, and said back and legs of said staple being seated in said body and posts, respectively, such that, in use, said preloaded staple assembly is fixed to said substrate over the elongate member by the stapling tool with said elongate member received in said receptacle and engaged by said protuberance.

According to yet another aspect of the present invention there is provided a saddle for use in a stapling tool with a staple having a back and two legs extending from the back, the stapling tool being capable of driving the staple over the saddle into a substrate so as to provide fixing of an elongate member onto the surface, the saddle comprising:

a body; and, two posts extending from the body, the body and the posts defining a receptacle for receiving the elongate member on the substrate and being adapted to have the staple seated over the body and down the posts; and, said body including at least one protuberance extending into said receptacle such that, in use, the staple is driven into the substrate over the saddle and over the elongate member, with the saddle inhibiting contact between the staple and the member, and said at least one protuberance engaging the elongate member in the receptacle.

In a preferred embodiment, the assembly further comprises locking means for locking the staple to the saddle to substantially prevent relative movement of the staple away from the saddle. It is envisaged that the locking means comprises engaging means on the staple legs for engaging the saddle posts. In a preferred form, the engaging means engages a bottom surface of the saddle posts. In a most preferred form, the engaging means comprises a first barb formed on an inside surface of each staple leg.

Preferably, in order to assist in retention of the staple in the underlying surface, the staple legs are provided with one or more further barbs disposed beneath the first barb.

In an alternate form, the staple legs are provided with a resinous adhesive coating of the type which when activated by heat energy, acts as an adhesive, whereby, in use, when the staple is driven into the substrate, frictional forces acting on the staple legs create heat energy to activate the resinous adhesive coating.

Embodiments of the invention will now be described by way of example only, with reference to the accompanying drawings.

BRIEF DESCRIPTION OF THE DRAWINGS

FIG. 3 is a side view of a line of interconnected staple assemblies of the type shown in FIG. 2; and FIG. 4A–4F is a schematic representation of embodiments of the staple assembly in use fastening one or more cables.

DESCRIPTION OF THE PREFERRED EMBODIMENTS

Figure 1:
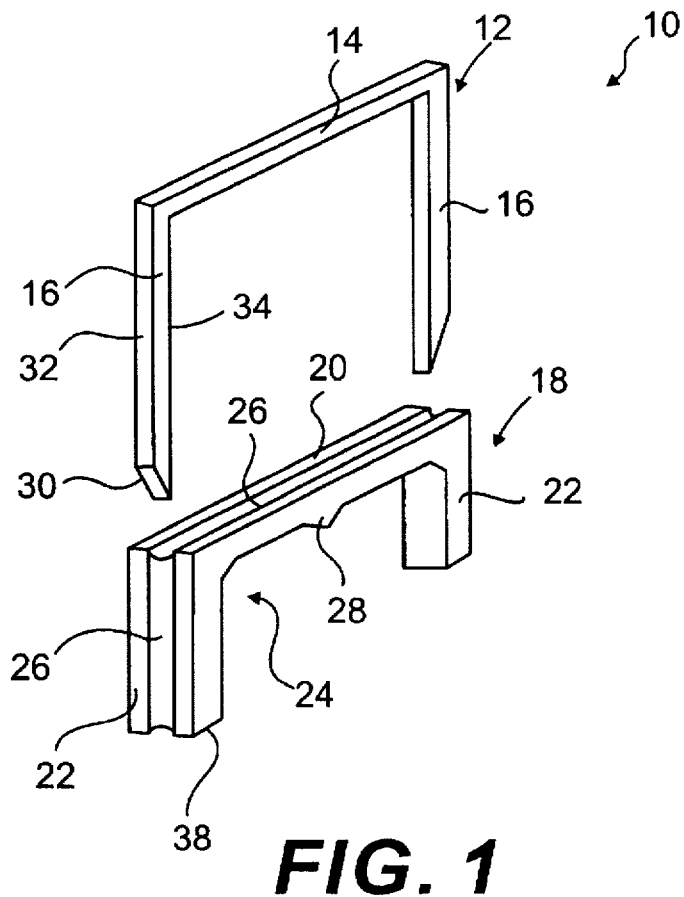
FIG. 1 is a perspective view, seen from above, of a staple assembly in accordance with a first embodiment of this invention.

A first embodiment of a staple assembly 10 in accordance with the present invention as shown in FIGS. 1 and 4A–4C.

The staple assembly 10 is typically for use in a stapling tool (not shown) for fixing an elongate member such as a cable C onto a substrate (not shown) such as a wooden beam. The staple assembly 10 comprises a staple 12 having a back 14. Two legs 16 depend from the opposite ends of back 14 and are substantially mutually parallel. The assembly 10 also includes a saddle 18 for receiving the staple 12. The saddle 18 comprises a body 20 and two posts 22 which depend from opposite ends of body 20 in the same direction in a mutually parallel manner. The posts 22 and body 20 define a receptacle 24 for receiving the cable C on the substrate.

The saddle 18 is adapted to have the staple 12 seated over the body 20 and down the posts 22. This adaptation is provided by the inclusion of a groove 26 which is formed along an outer side surface of the posts 22 and along an upper surface of body 20.

Accordingly, when the staple 12 is driven into the substrate over the saddle 18, the back 14 resides in the portion of groove 26 formed along body 20 and the legs 16 reside in the portion of the groove 26 along the posts 22.

The body 20 is further provided with a protuberance 28 which extends into the receptacle 24 for engaging the cable C. As seen most clearly in FIGS. 4A, 4E and 4F, the protuberance 28 need not engage the cable C centrally but may in fact engage the cable at a position offset from its centre. When the assembly 10 is in use, the staple 12 is driven onto the saddle 18 and into the substrate over the cable C with the saddle 18 inhibiting contact between the staple 12 and the cable C, and with the protuberance 28 engaging the cable C in the receptacle 24. The depth of penetration of legs 16 is controlled by the length of posts 22. It is only the portion of legs 16 below the bottom of posts 22 when the staple 12 is seated in groove 26 that it can penetrate into the substrate. This is because the posts 22 have a relatively large and flat under surface 38 which prevents the saddle 18 from penetrating the substrate. Thus the saddle offers protection to the cable C against crushing by the force used to drive the staple 12 into the substrate.

In order to assist in the retention of stable 12 in the substrate, free end 30 of each leg 16 is chamfered from a side 32 opposite its respective post 22 to a side 34 adjacent its respective post 22. The chamfering assists in causing the legs 16 to curve inwardly when the staple 12 is driven into the surface.

While the staple 12 and saddle 18 can be loaded in separate magazines or chambers of a stapling gun (not shown) so that the staple 12 is seated onto the saddle 18 and driven into the surface by the action of a hammer or plunger of the stapling tool in a preferred form, the assembly 10 is prefabricated or preloaded with the staple 12 already seated on the saddle 18. In this form, a stapling gun having only a single chamber is required. Further, in the prefabricated state, the likelihood of jamming is reduced.

Figure 2:
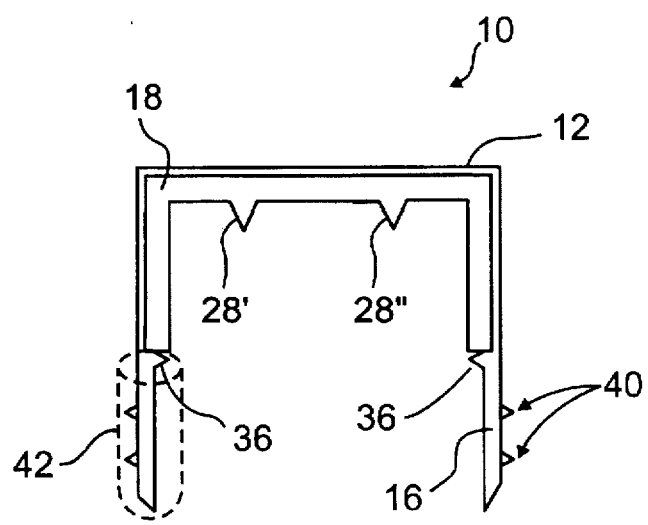
FIG. 2 is a front view of a second embodiment of the staple assembly.

In a further embodiment of the assembly shown in FIG. 2, the assembly 10 is provided with locking means for substantially preventing separation of the staple 12 from the saddle 18 when in a preloaded or fabricated state. The locking means is in the form of a barb 36 formed on the inside surface 34 of each leg 16. The barb 36 is located on the leg 16 at a position so as to abut or at least lie in close proximity to undersurface 38 of the posts 22.

By providing the locking means, when in the preloaded or fabricated state, it is substantially impossible for the staple 12 to be separated from the body 20 during normal handling and transportation. This feature is particularly useful in minimising jamming in a staple gun which may occur if the staple moves from and becomes misaligned with its saddle. It also ensures that during transportation the staples do not separate from the saddles.

To further assist in retaining the staple 12 in softer type of surfaces, the outside 32 of each leg can also be provided with one or more further barbs 40.

The assembly 10 shown in FIG. 2 also illustrates a variation of the saddle 18. In this figure, the saddle 18 is provided with two spaced apart protuberances 28' and 28". The protuberance 28' and 28" are equally spaced about the middle of body 20.

In yet a further variation, the portion of each leg 16 below the undersurface 38 of posts 22, in a preloaded assembly 10, can be provided with a resinous adhesive coating 42 as shown in phantom in FIG. 2. The coating 42 is of the type which is activated by heat so that upon driving the staple 12 into an underlying substrate the coating 42 is activated by heat energy produced from fiction so that it acts as an adhesive to bond the staple 12 to the substrate.

For ease of handling and use, a plurality of assemblies 10 are connected together in a line as shown in FIG. 3, with a gap or space formed between adjacent assemblies 10. Adjacent assemblies 10 are connected together by small bridges 44 which connect the bodies of adjacent saddles 18 and bridges 46 which connect posts 22 of adjacent saddles 18. Typically the bridges 44 and 46 together with the saddles 18 are made from plastics material. The bridges 44 and 46 being designed to fracture or otherwise be severed with the action of a hammer or plunger used for driving the staple 12 into the surface.

Figure 4C:
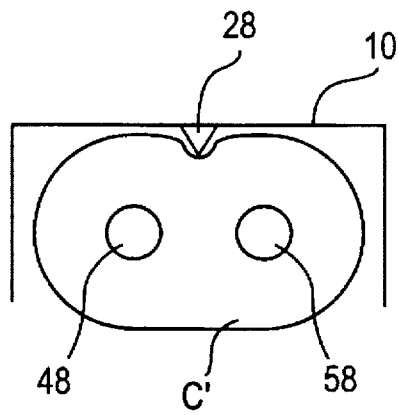
Figure 4D:
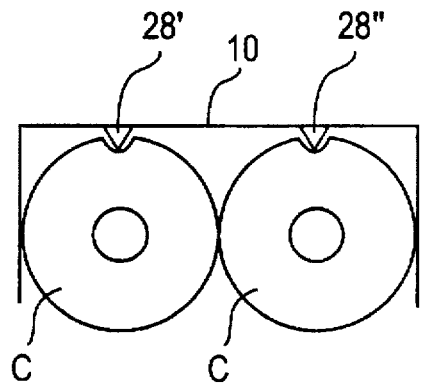
Figure 4E:
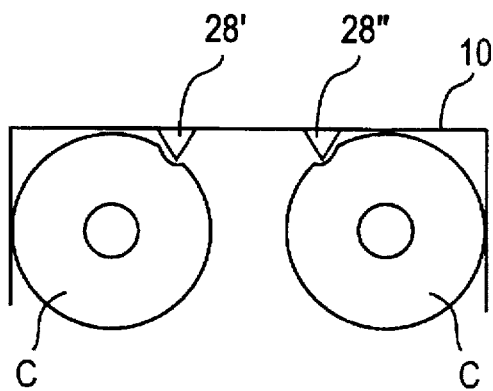
Figure 4F:
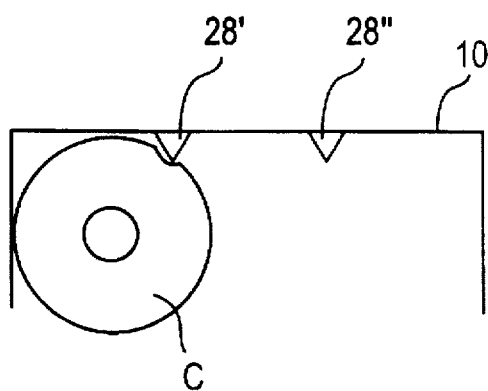

As seen in FIGS. 4A-4F, by reason of the inclusion of the protuberances 28, it is not necessary for the saddle 18 to be configured so that the receptacle 24 is of a complimentary size and configuration to the cable C to be fastened to the surface. The protuberances 28 act downwardly and bite into a coating or insulating layer on cable C when the staple 12 is driven into the surface. The cable C is then firmly held in place either by action of the protuberance 28 alone, for example as shown in FIG. 4B or alternatively the cable C may be held against one post 28, a portion of the body 20 up to protuberance 28 and the protuberance 28 itself.

As shown in FIGS. 4D and 4E, the assembly 10 of any one size may also be used for fastening two or more cables. This again arises because of the action of the protuberances 28 as discussed above in gripping or biting into the coating or insulating layer on the cables C. Accordingly, it can be seen that the assembly 10 is generally of greater versatility than known staple/saddle combinations.

FIG. 4C illustrates the assembly 10 as shown in FIG. 1 used with a common household twin conductor cable C'. When used in this manner, the protuberance 28 bites into the insulation of cable C' between the conductors 48 and 50.

Now that embodiments of the invention have been described in detail, it will be apparent to those skilled in the relevant arts that numerous modifications and variations may be made without departing from the basic inventive concepts. For example, while the illustrated embodiments show saddles 18 with one or two protuberances 28, any number of protuberances can be formed along the body 20. Further, while FIG. 2 shows a staple 12 with barbs 40 and resinous adhesive coating 42 both of which are used to assist in retaining the staple 12 in the surface, either one can of course be used separately without the other. Furthermore, the resinous adhesive coating 42 can be used in place of the barbs 36 in order to lock the staples 12 onto respective saddles 18. In such an embodiment, the coating 42 is made along legs 16 from end 30 at least up to the underside 38 of posts 22. All such modifications and variations are deemed to be within the scope of the present invention, the nature of which is to be determined from the foregoing description and the appended claims.

The claims defining the invention are as follows:

1. A staple assembly for use in a stapling tool for fixing an elongate member onto a substrate, said staple assembly comprising:

a staple having a back and two legs extending in the same direction from said back;

a saddle for receiving the staple, said saddle comprising a body and two posts extending from the body and defining a receptacle for receiving said elongate member, the saddle being adapted to be received over the elongate member on the substrate and adapted to have the staple seated over the body and down the posts so that end portions of said legs of said staple extend beyond said posts and said posts having a bottom surface for limiting penetration of said staple into the substrate to said end portions of the legs of said staple, said body being provided with a protuberance extending into said receptacle for engaging said elongate member received in the receptacle; and a first barb formed on an inside surface of each leg to engage the bottom surface of an adjacent post.

2. A staple assembly according to claim 1, wherein said saddle is provided with a groove along its body for receiving said back of said staple.

3. A staple according to claim 2, wherein said groove further extends along said posts for receiving said legs of said staple.

4. A staple assembly according to claim 1, wherein each leg has a free end and is chamfered at said free end from a side opposite its respective post to a side adjacent its respective post so that when said legs extend into said substrate they curve inwardly.

5. A staple assembly according to claim 1, wherein the staple legs are provided with one or more further barbs disposed beneath the first barb.

6. A staple assembly according to claim 1, wherein the staple legs are provided with a resinous adhesive coating of the type which when activated by heat energy, acts as an adhesive, whereby, in use, when the staple is driven into the substrate, frictional forces acting on the staple legs create heat energy to activate the resinous adhesive coating.

7. A staple assembly according to claim 1, wherein said body is provided with a plurality of protuberances extending into said receptacle.

8. A staple assembly for use in a stapling tool for fixing an elongate member onto a substrate, the staple assembly comprising:

a staple having a back having opposite ends and respective legs depending substantially at right angles from each of said ends of said back, said legs being mutually parallel; and, a saddle separate from said staple and comprising a body having opposite ends and respective posts depending substantially at right angles from each of said ends of said body, said posts being mutually parallel, said body and posts defining a receptacle for receiving said elongate member said body including a protuberance extending into said receptacle for engaging said elongate member, and said body and posts further including recesses for seating said back and legs of said staple, respectively, such that respective end portions of said legs extend beyond corresponding end portions of said posts, such that, in use, said staple assembly is fixed to said substrate over said elongate member via said stapling tool, with said elongate member received in said receptacle and engaged by said protuberance and said legs extending into said substrate, said posts each having a bottom surface for preventing penetration of the saddle into the substrate so that penetration of said staple into said substrate is limited to said respective end portions of said legs extending beyond corresponding end portions of said posts; and a first barb formed on an inside surface of each leg to engage the bottom surface of an adjacent post.

9. A staple assembly according to claim 8, wherein said body is provided with a plurality of protuberances extending into said receptacle.

10. A pre-loaded staple assembly for receipt in a single chamber of a stapling tool for fixing an elongate member onto a substrate, said preload staple assembly comprising:

a staple having a back and two legs extending from said back; and a saddle having a body and two posts extending from said body, said body and posts defining a receptacle for receiving said elongate member, said body including a protuberance extending into said receptacle for engaging said elongate member, and said back and legs of said staple being seated in said body and posts, respectively, such that, in use, said preloaded staple assembly is fixed to said substrate over the elongate member by the stapling tool with said elongate member received in said receptacle and engaged by said protuberance, said posts each having a bottom surface for preventing penetration of the saddle into the substrate so that penetration of said staple into said substrate is limited to respective end portions of the legs of the staple extending beyond corresponding end surfaces of said posts; and a first barb formed on inside surface of each leg to engage the bottom surface of an adjacent post.

11. A staple assembly according to claim 10, wherein said saddle is provided with a groove along its body for receiving said back of said staple.

12. A staple according to claim 11, wherein said groove further extends along said posts for receiving said legs of said staple.

13. A staple assembly according to claim 10, wherein each leg has a free end and is chamfered at said free end from a side opposite its respective post to a side adjacent its respective post so that when said legs extend into said substrate they curve inwardly.

14. A staple assembly according to claim 10, wherein the staple legs are provided with one or more further barbs disposed beneath the first barb.

15. A staple assembly according to claim 10, wherein the staple legs are provided with a resinous adhesive coating of the type which when activated by heat energy, acts as an adhesive, whereby, in use, when the staple is driven into the substrate, frictional forces acting on the staple legs create heat energy to activate the resinous adhesive coating.

16. A staple assembly according to claim 10, wherein said body is provided with a plurality of protuberances extending into said receptacle.

* * * * *